(12) United States Patent
Courtney (10) Patent No.: US 11,146,594 B2
(45) Date of Patent: Oct. 12, 2021

(54) SECURITY INCIDENT BLOCKCHAIN

(71) Applicant: SEAGATE TECHNOLOGY LLC, Cupertino, CA (US)

(72) Inventor: Timothy J Courtney, Broomfield, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 216 days.

(21) Appl. No.: 16/428,454

(22) Filed: May 31, 2019

(65) Prior Publication Data

US 2020/0382555 A1    Dec. 3, 2020

(51) Int. Cl.
*H04L 29/06* (2006.01)
*G06F 16/182* (2019.01)
*H04L 9/06* (2006.01)
*H04L 9/08* (2006.01)

(52) U.S. Cl.
CPC .......... *H04L 63/20* (2013.01); *G06F 16/1824* (2019.01); *H04L 9/0631* (2013.01); *H04L 9/0643* (2013.01); *H04L 9/0838* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 10,536,445 B1 * | 1/2020 | Lerner | .................. | H04L 9/3239 |
| 10,637,645 B2 * | 4/2020 | Gray | ....................... | G06F 21/51 |
| 10,664,591 B2 * | 5/2020 | Gray | ..................... | H04L 9/3297 |
| 10,833,858 B2 * | 11/2020 | Gray | .................... | G06Q 20/382 |
| 2018/0307868 A1 | 10/2018 | Rettaroli et al. | | |
| 2019/0044976 A1 | 2/2019 | Smith | | |
| 2019/0097812 A1 * | 3/2019 | Toth | ...................... | H04L 9/3213 |

(Continued)

OTHER PUBLICATIONS

Zhai, Xiaojun; Zhang, Chongyang. A Cash Flow Blockchain Based Privacy-Preserving. 2018 5th IEEE International Conference on Cloud Computing and Intelligence Systems (CCIS). https://ieeexplore.ieee.org/stamp/stamp.jsp?tp=&arnumber=8691318 (Year: 2018).*

(Continued)

*Primary Examiner* — Jeremiah L Avery
(74) *Attorney, Agent, or Firm* — Holzer Patel Drennan (57) ABSTRACT

The technology disclosed herein provides a method to use a private distributed blockchain to generate a secure encrypted record of authentication attempts for a set of distributed network attached user devices or nodes. In at least one implementation, the method includes initiating a security incident blockchain for a network comprising a plurality nodes, provisioning each the plurality of nodes in the network with a synchronous key wherein a master node has a copy of all of the synchronous keys, adding a configuration transaction to the security incident blockchain, the configuration transaction including security policies for the plurality of nodes in the network, detecting a security incident at one of the plurality of nodes in the network, and in response to the detection of the security incident, performing a security incident response in compliance with the security policies as provided in the configuration transaction.

20 Claims, 8 Drawing Sheets

(56) References Cited

U.S. PATENT DOCUMENTS

2019/0115099 A1* 4/2019 Goux .................. G16H 40/20
2019/0139136 A1   5/2019 Molinari et al.

OTHER PUBLICATIONS

Halabi, Joe; Artail, Hassan. A Lightweight Synchronous Cryptographic Hash Chain Solution to Securing the Vehicle CAN bus. 2018 IEEE International Multidisciplinary Conference on Engineering Technology (IMCET). https://ieeexplore.ieee.org/stamp/stamp.jsp?tp=&arnumber=8603057 (Year: 2018).*

Hartl, Alexander et al. BeaconBlocks: Augmenting Proof-of-Stake with On-Chain Time Synchronization. 2019 IEEE International Conference on Blockchain (Blockchain). https://ieeexplore.ieee.org/stamp/stamp.jsp?tp=&arnumber=8946264 (Year: 2019).*

* cited by examiner

SECURITY INCIDENT BLOCKCHAIN

BACKGROUND

State of the art communication systems and networks have complex security policies. Generally, these communication policies require frequent updates and communication between various devices to share the updates. Furthermore, when there are a large number of devices in a network, it is difficult to communicate and track security incidents between various devices. Specifically, keeping permanent records of security incidents and sharing of security policies is difficult when a large number of devices are involved.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein provides a method to use a private distributed blockchain to generate a secure encrypted record of authentication attempts for a set of distributed network attached user devices or nodes. In at least one implementation, the method includes initiating a security incident blockchain for a network comprising a plurality nodes, provisioning each the plurality of nodes in the network with a synchronous key wherein a master node has a copy of all of the synchronous keys, adding a configuration transaction to the security incident blockchain, the configuration transaction including security policies for the plurality of nodes in the network, detecting a security incident at one of the plurality of nodes in the network, and in response to the detection of the security incident, performing a security incident response in compliance with the security policies as provided in the configuration transaction.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Implementations described herein provide system for using a private distributed security incident blockchain to allow a set of network attached devices to communicate security incident events and security incident event response information with each other. An implementation of such private distributed security incident blockchain provides a mechanism for a master device that can alter security policy and security incident response information for other devices. In an alternative implementation, the private distributed security incident blockchain also provides an interconnection mechanism for communication between separate security incident blockchains using a special routing node that is a member of multiple blockchains. In another implementation, the private distributed security incident blockchain provides a secure encrypted record of various security incidents and responses for a set of distributed network attached devices.

In one implementation, a distributed ledger node may be generated based on a hash generated using information about a security incident, information incorporating a communication regarding a security policy, etc., together with a digital signature of a device where such hash is generated. Such distributed ledger node may be stored on a distributed ledger. In one implementation, a copy of the distributed ledger may be stored in the memory of the device creating the security node. Alternatively, the distributed ledger may be stored on a network such as the Internet, which may be accessible to other third parties for independent verification.

An example of the distributed ledger is blockchain. Specifically, a blockchain is a decentralized and distributed digital ledger that is used to record transactions across many computers so that the record cannot be altered retroactively without the alteration of all subsequent blocks and the collusion of the network. This allows the participants to verify and audit transactions inexpensively. Thus, the distributed ledger provides a rich documentation and authentication about various security incidents and communications regarding security policies.

Figure 1:
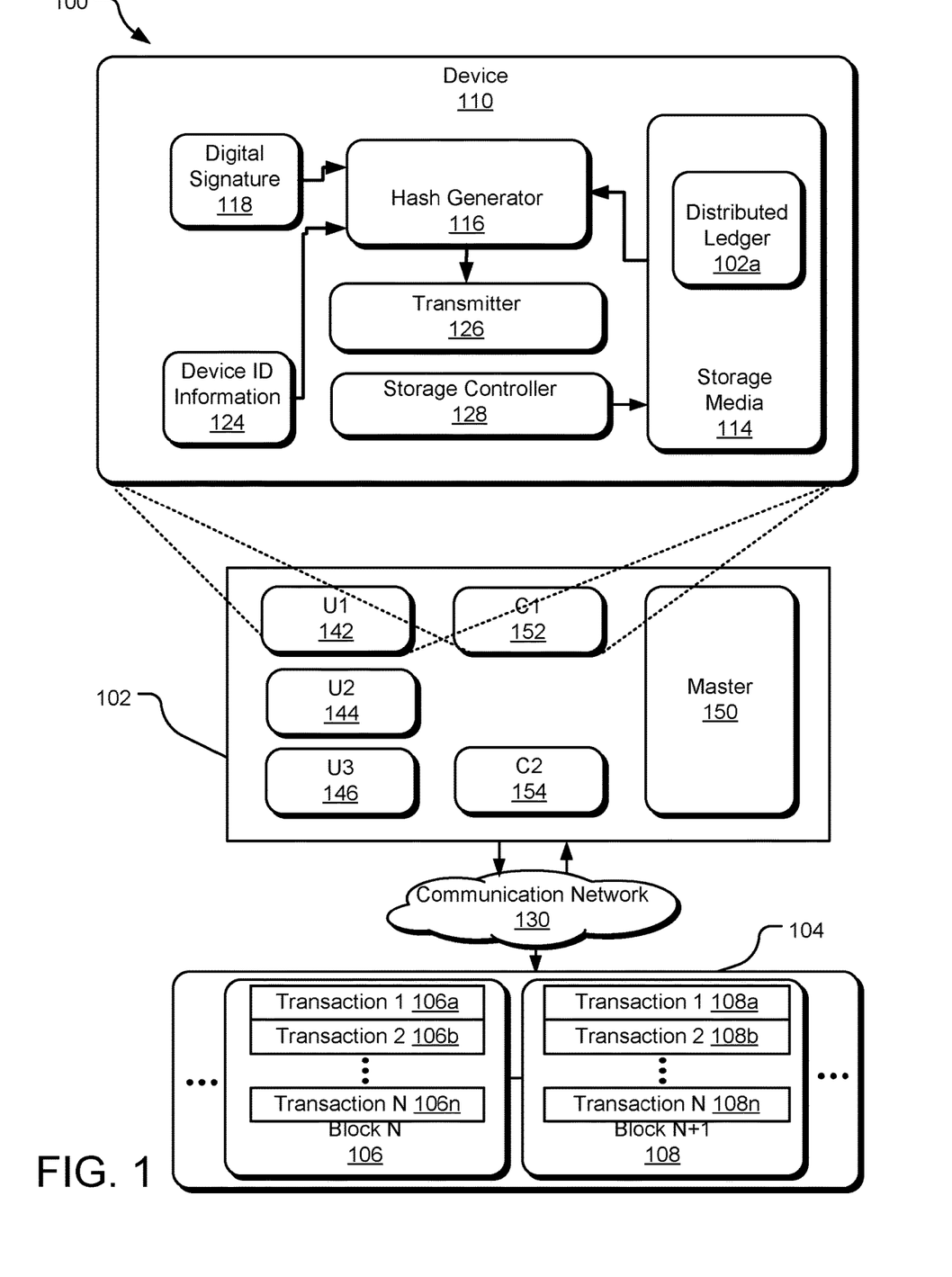
FIG. 1 illustrates an example block diagram of a security incident blockchain system using an example distributed ledger.

FIG. 1 illustrates an example block diagram 100 of a security incident blockchain system 102 using an example distributed ledger 104 to allow a set of network attached devices to communicate security incident events and security incident event response information with each other. The security incident blockchain system 102 may be a distributed blockchain system with a number of interconnected devices identified as nodes. The illustrated implementation of the security incident blockchain system 102 includes user nodes U1 142, U2 144, and U3 146, control nodes C1 152 and C2 154, and a master node 150.

The user nodes U1-U3 142-146 may have various processing and memory limitations. For example, the user nodes U1-U3 142-146 may be devices that perform various transactions but do not perform the proof of work function. Furthermore, the user nodes U1-U3 142-146 may keep a local copy of the blockchain and may truncate their local blockchain to some set of the last N relevant transactions of required information based on time and subject of such transactions.

The control nodes C1 152 and C2 154 may be both transactors and miners. Given that the given implementation of the security incident blockchain system 102 is a private blockchain, the proof of work function may be simplified as the miners may not be in competition with each other. The control nodes C1 152 and C2 154 may be required to maintain the entire blockchain history. Furthermore, one or more of the control nodes C1 152 and C2 154 may be a miner only control node.

The master control node 150 may be configured such that it can modify the security policies including security incident response information for all nodes. In one implementation, various nodes disclosed in FIG. 1 may be required to have a synchronous key and a unique RSA key pair. The synchronous key may be unique or may be shared by multiple devices. In any case the master control node 150 may have a copy of all synchronous keys.

For each security incident an affected node may create a security incident blockchain transaction. This transaction may consist of a node identifier ID, a plaintext record P1 and a ciphertext record C2=ENC(P2). The contents of the plaintext and ciphertext records may be specified in the security incident and response portion of the security policy for that node. The ciphertext record may be created by encrypting P2 with an advanced encryption standard (AES) key of that node. In one implementation, a plaintext record P1 contains plaintext information, which may be any information that is not confidential by nature or by statute. On the other hand, P2 may be encrypted as it may contain information that is protected by law or information that is confidential in nature or any information that could give information to an attacker regarding the detection of an in progress attack. The ENC function for P2 data may be, for example, AES-cipher blocker changing (CBC), AES Galois/Counter Mode GCM), AES-electronic codebook (ECB), etc.

The final transaction may be as follows: T=(ID∥P1∥C2). The transaction T is then signed with the private RSA device key and broadcast to all the blockchain nodes. After the transaction has been verified the blockchain nodes may use the plain text security incident transaction content to determine their local response to the security incident, if any. The master node 150 and any other nodes that have a copy of the specified AES key may decrypt C2 and take any specified action. In addition, the master control node 150 may decide upon further security responses including updating the security policy and security incident response information for some or all nodes U1-U3 142-146 and C1, C2 152, 154. Routing nodes (as disclosed further below in FIGS. 6 and 7) may use the information in their respective security policies to forward security incident response information to other security incident blockchains.

Configuration of each of the nodes 142-154 may be illustrated by a device 110. Specifically, the device 110 includes a digital signature module 118 that generates a digital signature that may be used together with device ID 124 by a hash generator 116 to generate a hash that may be transmitted by a transmitter 126 to other of the nodes 142-154. The device 110 may also include a storage media 114 and a storage controller 128. In one implementation, each of the nodes 142-154 may store a copy of the distributed ledger 102a in the storage media 114. Furthermore, the hash generator 116 may use information about previous transactions from the distributed ledger 102a when generating a new hash.

The distributed ledger 102 documents various transactions involving security incidents events and security incident event responses related to one or more of the nodes U1-U3, C1, C2 142-154. The distributed ledger 102 may be implemented as a private (permissioned) ledger, a hybrid private/public ledger, or a fully public ledger. A private ledger is a ledger where each node supporting the ledger is authenticated or authorized to use the ledger. Furthermore, a private ledger may not be publicly visible or accessible by some nodes or outside parties. In a public distributed ledger, the full distributed ledger 102 is distributed publicly to many nodes and is accessible to all nodes in the network. Each node supporting the ledger includes a cryptographic identity, which may comprise a public/private key pair.

Figure 2:
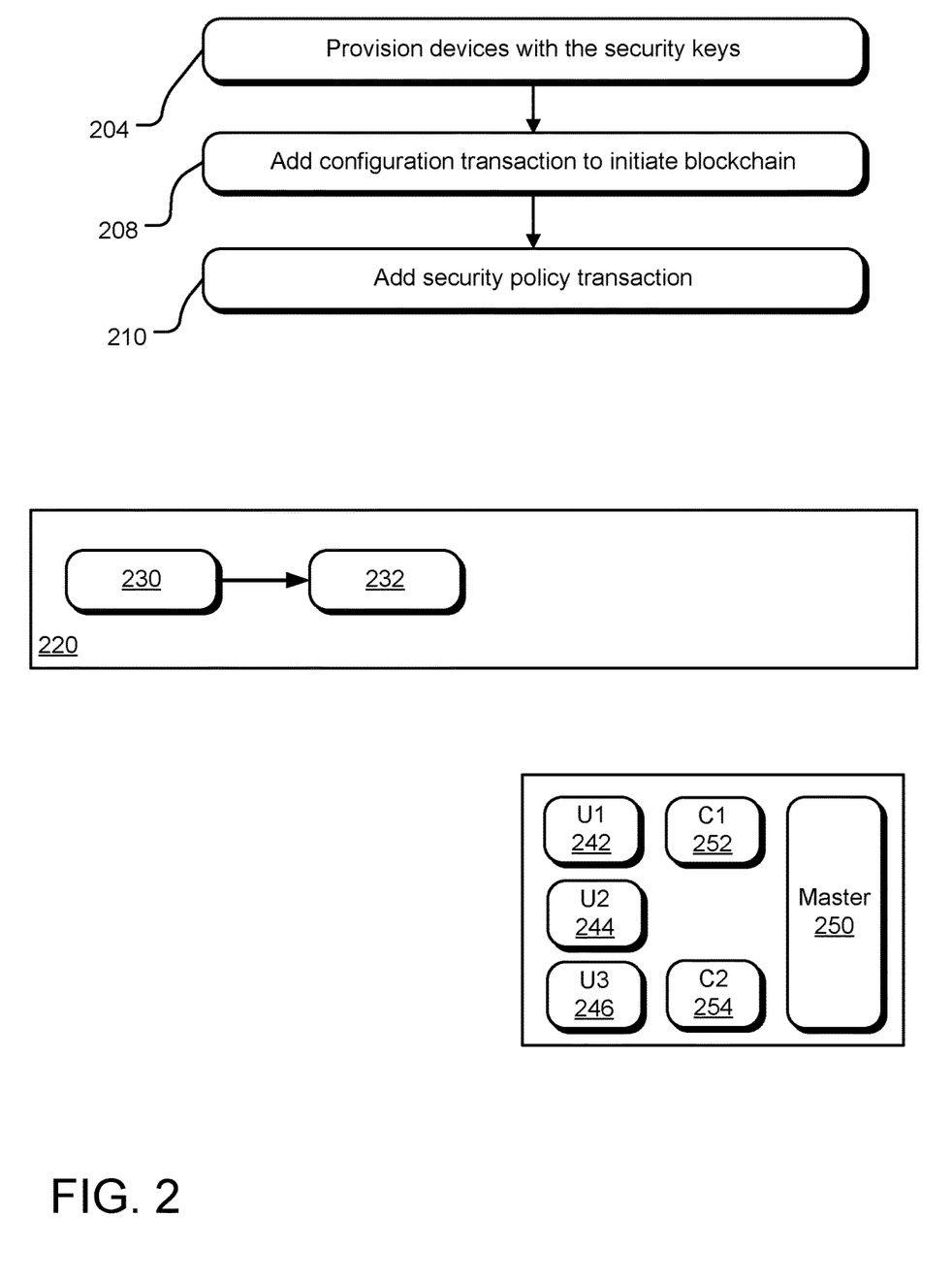
FIG. 2 illustrates an example flowchart illustrating configuring of the security incident blockchain system disclosed herein.

FIG. 2 illustrates an example flowchart 200 illustrating configuring of the security incident blockchain system disclosed herein. An operation 204 provisions various devices with the security keys. Specifically, at 204 all devices are provisioned with required security keys using a key distribution agreement among the devices. For example, the master node 250 has a copy of all synchronous keys resulting in RSA key pairs such as AU1, AU2, AU3, AC1, AC2, and AM, respectively for the user nodes U1 242-U3 246, the control nodes C1 252, C2 254, and the master node 250. In an alternative implementation, the master node 250 may also have all the synchronous keys to provide asynchronous key pairs SU1, SU2, SU3, SC1, SC2, and SM, respectively for the user nodes U1 242-U3 246, the control nodes C1 252, C2 254, and the master node 250.

An operation 208 adds a configuration transaction 230 to initiate the security incident blockchain disclosed herein. Specifically, at operation 208 the master node 250 adds the configuration transaction that includes information about the security incident blockchain. All of the other nodes, including the user nodes U1 242-U3 246, the control nodes C1 252, C2 254 verify the configuration transaction. Subsequently, at operation 210 the master node 250 adds a security policy transaction to the blockchain of all devices. In one implementation, the security policies of the security policy transaction 232 include security incident response information. All devices verify the transaction(s) and update their internal security policy plus security incident response information in accordance with the security policies of the security policy transaction. As a result, the blockchain 220 includes two transactions, specifically the configuration transaction 230 and the security policy transaction 232.

Figure 3:
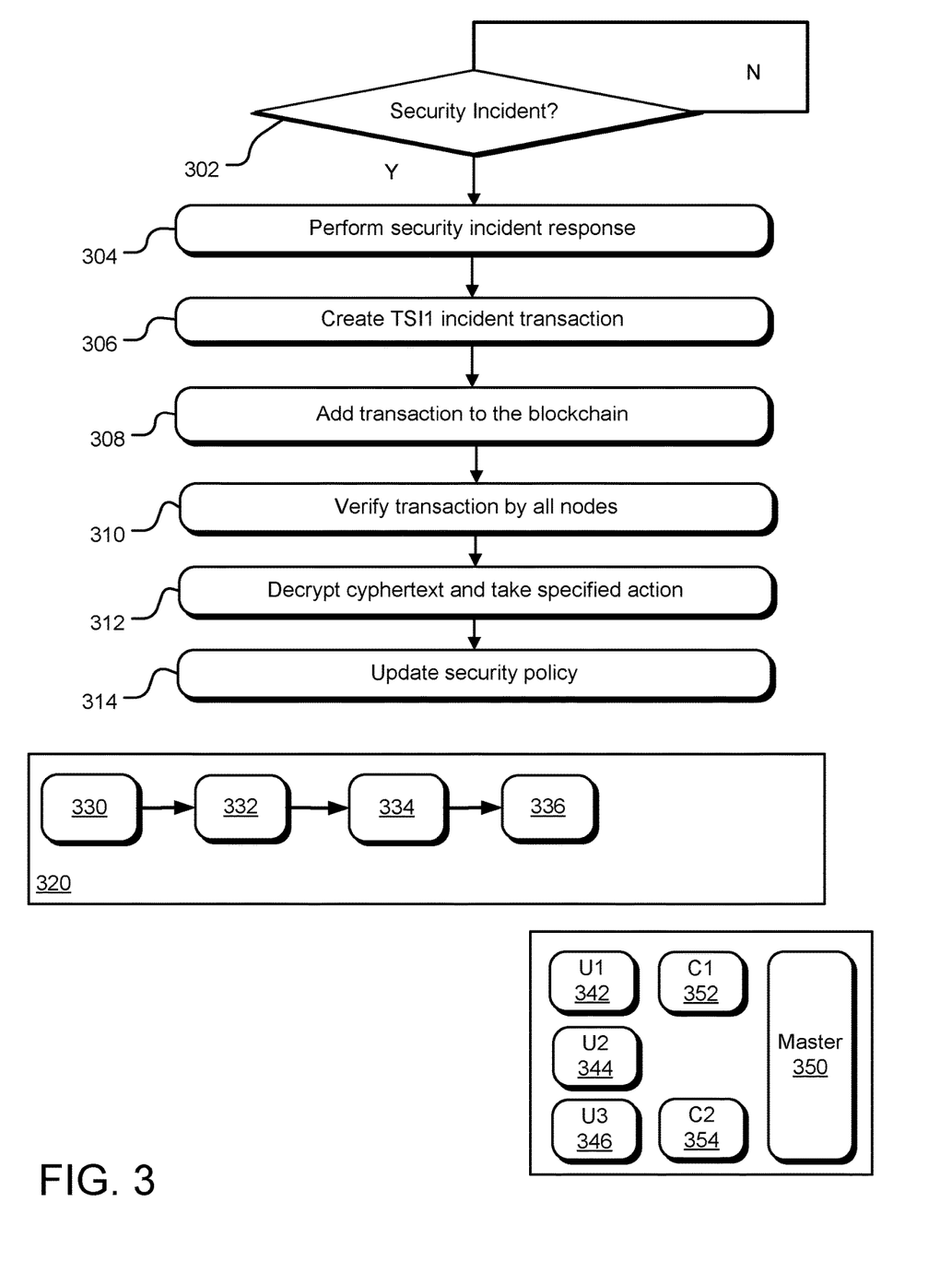
FIG. 3 illustrates an example block diagram of a security incident blockchain system at an intermediate stage.

FIG. 3 illustrates an example flowchart 300 illustrating operations of a security incident blockchain system disclosed herein at an intermediate stage. Before the beginning of the operations disclosed in FIG. 3, the blockchain 320 may include a configuration transaction 330 and a security policy transaction 332. At operation 302 a node, such as for example node U1 342, may detect a security incident. For example, the security incident may be an attempt to break in a firewall of the system that the node U1 342 is part of In response to detection of the security incident, the node U1 342 consults its security policy and at operation 304 it performs the appropriate security incident response as per the security policy.

After performing the security incident response, at operation 306, the node U1 342 creates a TS|1 incident transaction 334. The TS|1 incident transaction 334 may include an identifier of the node U1 342, plain text P1 indicating information about the security incident, and a cipher text record C2, where the C2=ENC(P2) is encrypted using the advanced encryption standard (AES) key of the node U1 342. Here P2 is also plain text P1 indicating information about the security incident and P1 and P2 may not be the same. Thus, the final TS|1 incident transaction 334 is as follows TS|1=(U1 ID||P1||C2). The transaction TS|1 334 is then signed with the private RSA device key of the node U1 342 and broadcast to all the blockchain nodes U2 342-U3 346, the control nodes C1 352, C2 354, and the master node 350.

After the transaction TS|1 has been verified, the blockchain nodes U2 342-U3 346, the control nodes C1 352, C2 354 will use the plaintext security incident transaction content to determine their local response to the security incident, if any. Furthermore, the master node 350 and any other nodes that have a copy of the specified AES key may decrypt C2 and take any specified action. In one implementation, the master node 350 may decide upon further security responses including updating the security policy and security incident response information for some or all nodes U1-342-C2 354. Specifically, the master node 350 may use plain text P1 and P2 to make control decisions for the entire network including updating and distributing new security policies with security incident response information. In this case the new security policy for the node U1 342 is updated and a new security policy transaction 336 is added to the blockchain 320.

Figure 4:
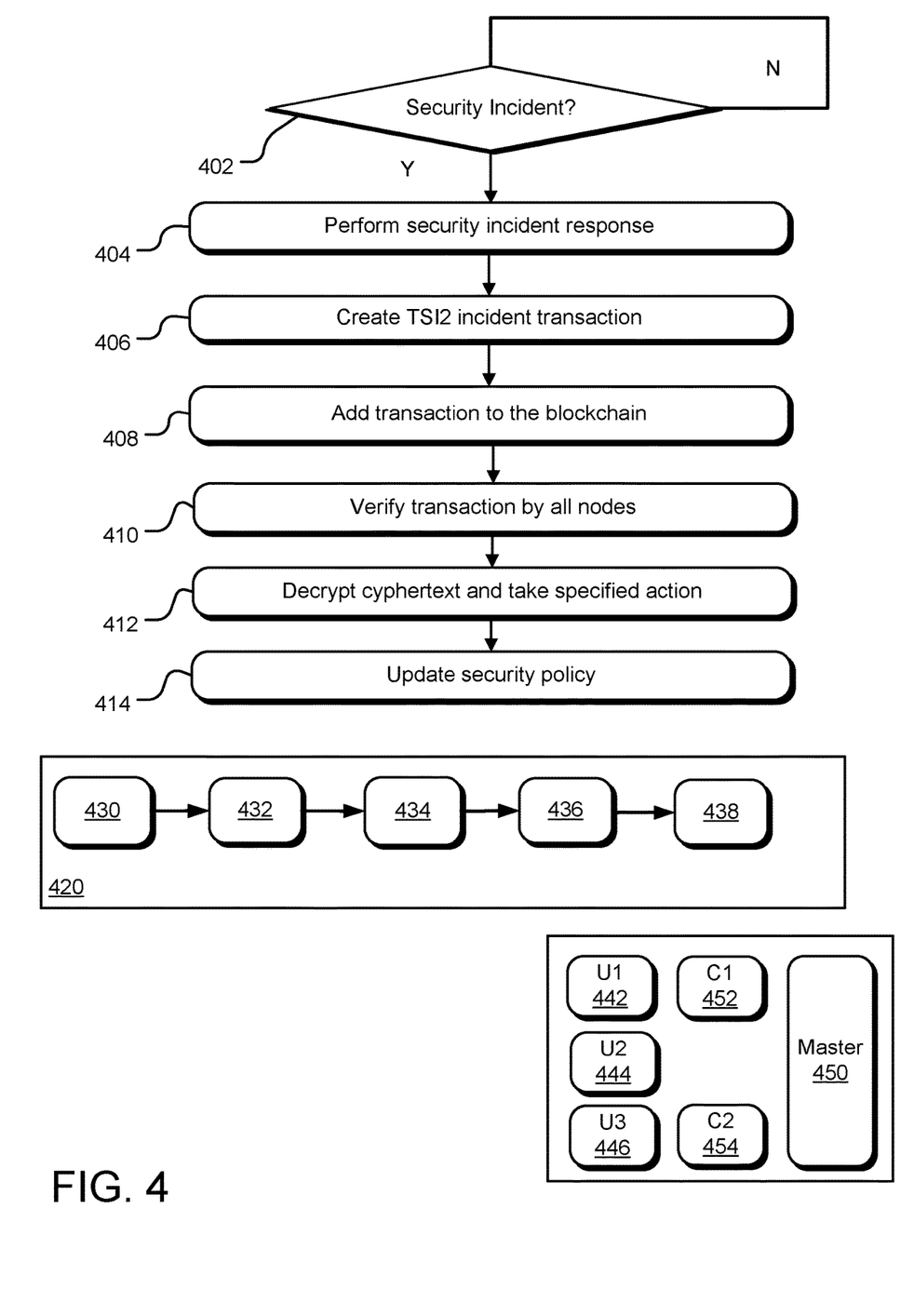
FIG. 4 illustrates an alternative example flowchart illustrating configuring of the security incident blockchain system disclosed herein.

FIG. 4 illustrates an example flowchart 400 illustrating operations of a security incident blockchain system disclosed herein at an intermediate stage. Before the beginning of the operations disclosed in FIG. 4, the blockchain 420 may include a configuration transaction 430 and a security policy transaction 432, an incident transaction TS|1 434, and a new security policy transaction 436. At operation 402 a node, such as for example node U3 446, may detect a security incident. In response to detection of the security incident, the node U3 446 consults its security policy and at operation 404 it performs the appropriate security incident response as per the security policy.

After performing the security incident response, at operation 406, the node U3 446 creates a TS|2 incident transaction 438. The TS|2 incident transaction 438 may include an identifier of the node U3 446, plain text P1 indicating information about the security incident, and a cipher text record C2, where the C2=ENC(P2) is encrypted using the advanced encryption standard (AES) key of the node U3 446. Here P2 is also plain text P1 indicating information about the security incident and P1 and P2 may not be the same. Thus, the final TS|2 incident transaction 438 is as follows TS|2=(U3 ID||P1||C2). The transaction TS|2 438 is then signed with the private RSA device key of the node U3 446 and broadcast to all the blockchain nodes U1 442-U2 444, the control nodes C1 452, C2 454, and the master node 450.

After the transaction TS|2 438 has been verified, the blockchain nodes U1 442-U2 444, the control nodes C1 452, C2 454 will use the plaintext security incident transaction content to determine their local response to the security incident, if any. Furthermore, the master node 450 and any other nodes that have a copy of the specified AES key may decrypt C2 and take any specified action. In one implementation, the master node 450 may decide upon further security responses including updating the security policy and security incident response information for some or all nodes U1-342-C2 354. Specifically, the master node 450 may use plain text P1 and P2 to make control decisions for the entire network including updating and distributing new security policies with security incident response information. In this case there are no security policy updates.

Figure 5:
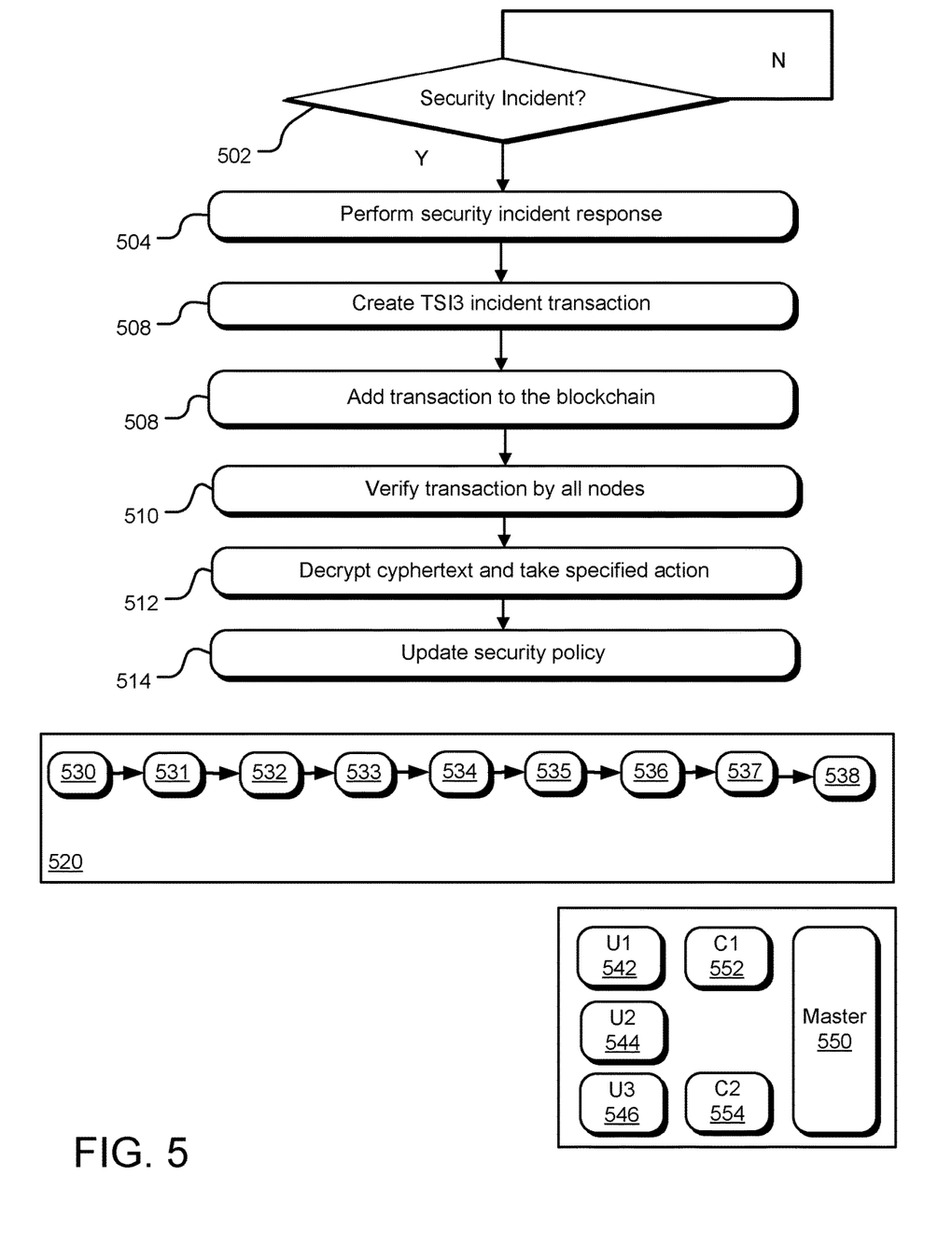
FIG. 5 illustrates another example block diagram of the security incident blockchain system at another intermediate stage.

FIG. 5 illustrates another example flowchart 500 illustrating operations of a security incident blockchain system disclosed herein at an intermediate stage. Before the beginning of the operations disclosed in FIG. 5, the blockchain 520 may include a configuration transaction 530 and a security policy transaction 531, an incident transaction TS|1 532, a new security policy transaction 533, and another incident transaction TS|2 534. At operation 502 a node, such as for example a control node C1 552, may detect a security incident. In response to detection of the security incident, the node C1 552 consults its security policy and at operation 504 it performs the appropriate security incident response as per the security policy.

After performing the security incident response, at operation 506, the control node C1 552 creates a TS|3 incident transaction 536. The TS|3 incident transaction 536 may include an identifier of the node C1 552, plain text P1 indicating information about the security incident, and a cipher text record C2, where the C2=ENC(P2) is encrypted using the advanced encryption standard (AES) key of the node C1 552. Here P2 is also plain text P1 indicating information about the security incident and P1 and P2 may not be the same. Thus, the final TS|3 incident transaction 536 is as follows TS|3=(C1 ID||P1||C2). The transaction TS|3 536 is then signed with the private RSA device key of the node C1 552 and broadcast to all the blockchain nodes U1 542-U3 546, the control node C2 554, and the master node 550.

After the transaction TS|3 536 has been verified, the blockchain nodes U1 542-U3 546, the control node C2 554 will use the plaintext security incident transaction content to determine their local response to the security incident, if any. Furthermore, the master node 550 and any other nodes that have a copy of the specified AES key may decrypt C2 and take any specified action. In one implementation, the master node 550 may decide upon further security responses including updating the security policy and security incident response information for some or all nodes U1-542-C2 554. Specifically, the master node 550 may use plain text P1 and P2 to make control decisions for the entire network including updating and distributing new security policies with security incident response information. In this case the security policies for C1 and C2 are both updated, resulting in new C1 security policy transaction 537 and new C2 security policy transaction 538.

Figure 6:
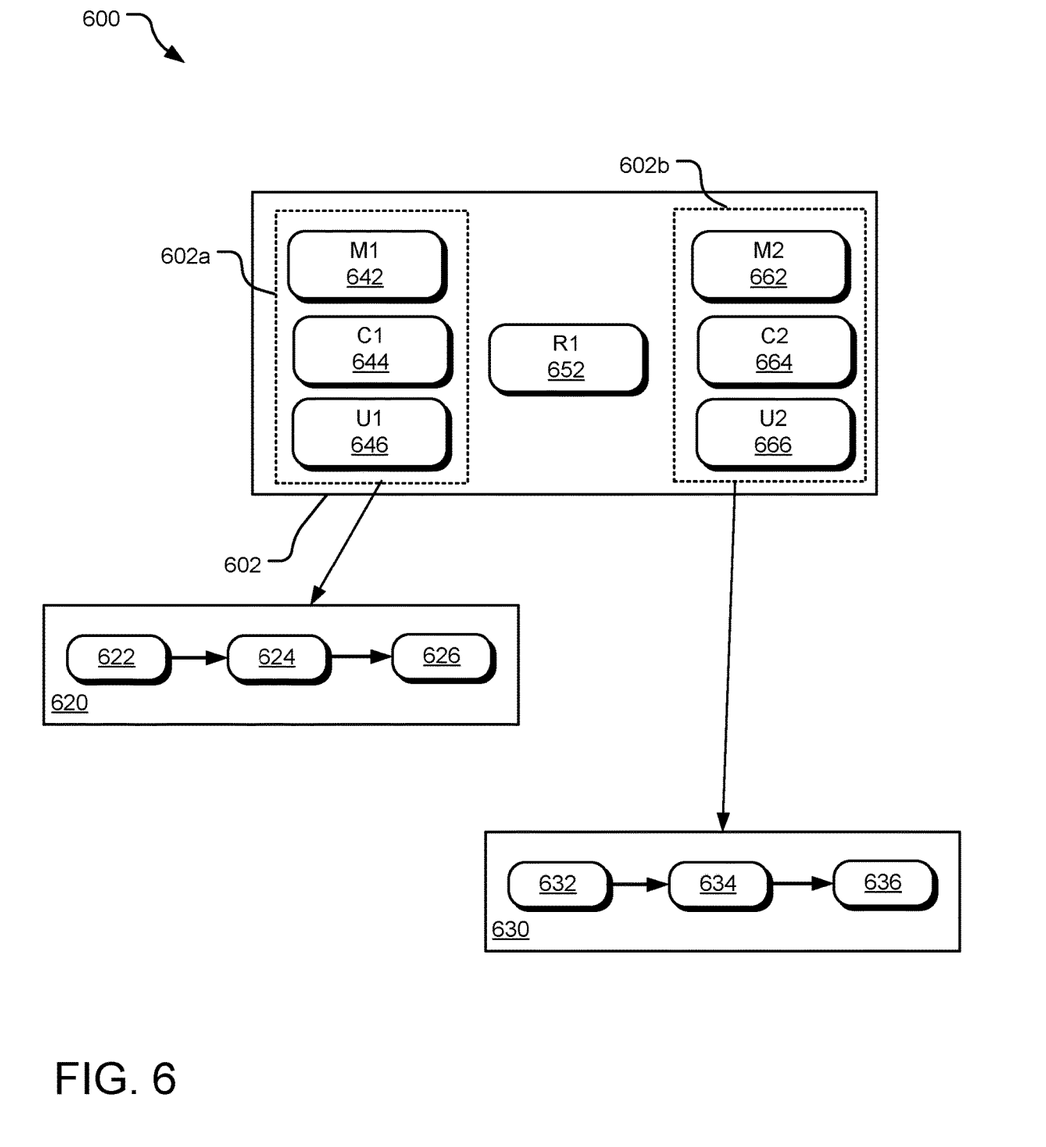
FIG. 6 illustrates yet another example block diagram of the security incident blockchain system using a routing node at an intermediate stage.

FIG. 6 illustrates yet another example block diagram 600 of the security incident blockchain system using a routing node R1 652 at an intermediate stage. Specifically, a device network 602 allows a set of network attached devices to communicate security incident events and security incident event response information with each other. The device network 602 may be a distributed device network with a number of interconnected devices identified as nodes. The illustrated implementation of the device network 602 includes master nodes M1 642 and M2 662, control nodes C1 644 and C2 664, and user nodes U1 646 and U2 666. Specifically, the master node M1 642, the control node C1 644, and the user node U1 646 may form one sub device network 602a and the master node M2 662, the control node C2 664, and the user node U2 666 may form another sub device network 602*b*. The router node R1 652 may be connected to both sub device networks 602*a* and 602*b*.

In the illustrated implementation, the sub device network 602*a* may manage a blockchain 620 that includes a configuration transaction 622, a security policy transaction 624, and a security incident transaction 626. For example, the security incident transaction 626 may include six security incidents S|1-6. The sub device network 602*b* may manage a blockchain 630 that includes a configuration transaction 632, a security policy transaction 634, and a security incident transaction 636. For example, the security incident transaction 636 may include three security incidents S|1-3.

The router nodes R1 652 may be used to connect two or more separate security incident response blockchains, such as the blockchains 620 and 630. In the illustrated implementation, the router node R1 652 may pass information regarding certain security events from the blockchain 620 to the blockchain 630. The router node R1 652 may have multiple security policies, one for each of the blockchains 620 and 630 that may describe what information to forward to the other blockchains. While the illustrated implementation discloses only one router node R1 652, in alternative implementations, there can be any number of router nodes.

Figure 7:
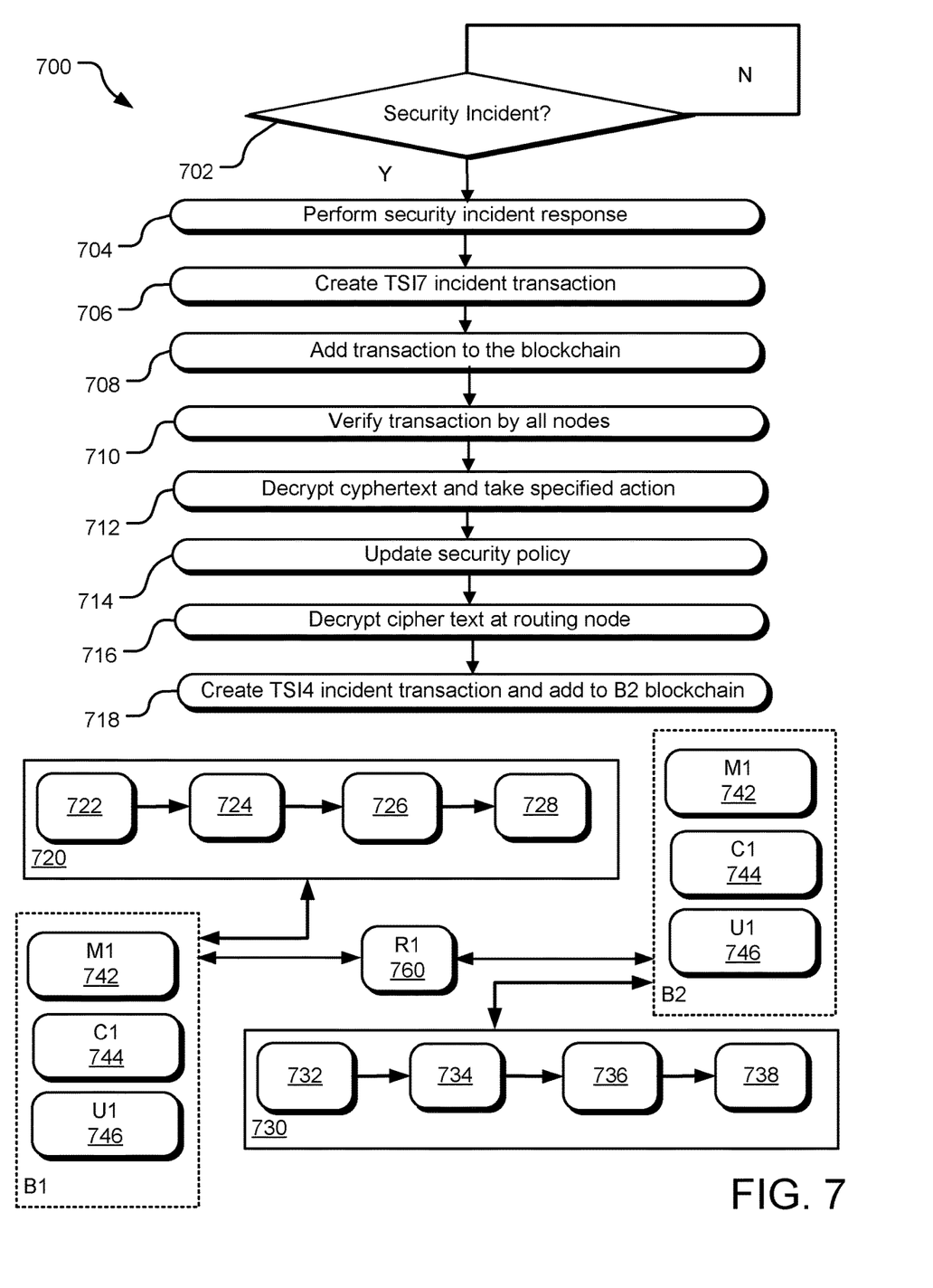
FIG. 7 illustrates yet another example block diagram of the security incident blockchain system using the routing node at another intermediate stage.

FIG. 7 illustrates yet another example flowchart 700 illustrating operations of a security incident blockchain system disclosed herein using a router node that connects two separate blockchains 720 and 730. Before the beginning of the operations disclosed in FIG. 7, the blockchain 720 may include a configuration transaction 722, a security policy transaction 724, and a security incidents transaction 726. Similarly, the blockchain 730 may include a configuration transaction 732, a security policy transaction 734, and a security incidents transaction 736.

At operation 702, a node U1 746 using blockchain 720 detects a security incident. In response to detection of the security incident, the node U1 746 consults its security policy and at operation 704 it performs the appropriate security incident response as per the security policy. At operation 706, the node U1 746 than creates a security incident transaction TS|7 728. At operation 708 it adds the security incident transaction TS|7 728 in the blockchain 720. The TS|7 incident transaction 728 may include an identifier of the node U1 746, plain text P1 indicating information about the security incident, and a cipher text record C2, where the C2=ENC(P2) is encrypted using the advanced encryption standard (AES) key of the node U1 342. Here P2 is also plain text P1 indicating information about the security incident and P1 and P2 may not be the same. All devices using the blockchain 720, namely master node M1 742 and the control node C1 744, verifies the incident transaction TS|7 728 at operation 710.

Furthermore, all nodes using the blockchain 720, namely master node M1 742 and the control node C1 744, use the plain text information P1 from the incident transaction TS|7 728 and take specific action. Specifically, at operation 712, the master node M1 742 and the control node C1 744 decrypt ciphertext C2=P2 and take specified actions. At operation 714, the master node M1 742 and the control node C1 744 make control decisions for the entire B1 network including updating and distributing new security policies with security incident response information. In this case there are no security policy updates.

At operation 716, the routing node R1 760 decrypts cipher text C2=P2 and uses information from plain text P1 and cipher text P2 to decide whether or not to route the transaction TS|7 728 to blockchain 730. If the answer is yes, at operation 718, the routing node R1 760 creates a new incident transaction TS|4 738 for blockchain 730 and adds the incident transaction TS|4 transaction 738 to blockchain 730. Subsequently, all devices in the network B2, namely a master node M1 742, a control node C1 744, and a user node U1 746 verify the incident transaction TS|4 transaction 738.

Finally, all nodes in network B2 use the plaintext information from incident transaction TS|4 738 and take specified actions. For example, the master node M1 742 and certain other B2 nodes decrypt ciphertext C2=P2 and take specified actions. Specifically, the master node M1 742 uses plain text P1 and cipher text P2 to make control decisions for the entire B2 network including updating and distributing new security policies with security incident response information. In this case there are no security policy updates.

Figure 8:
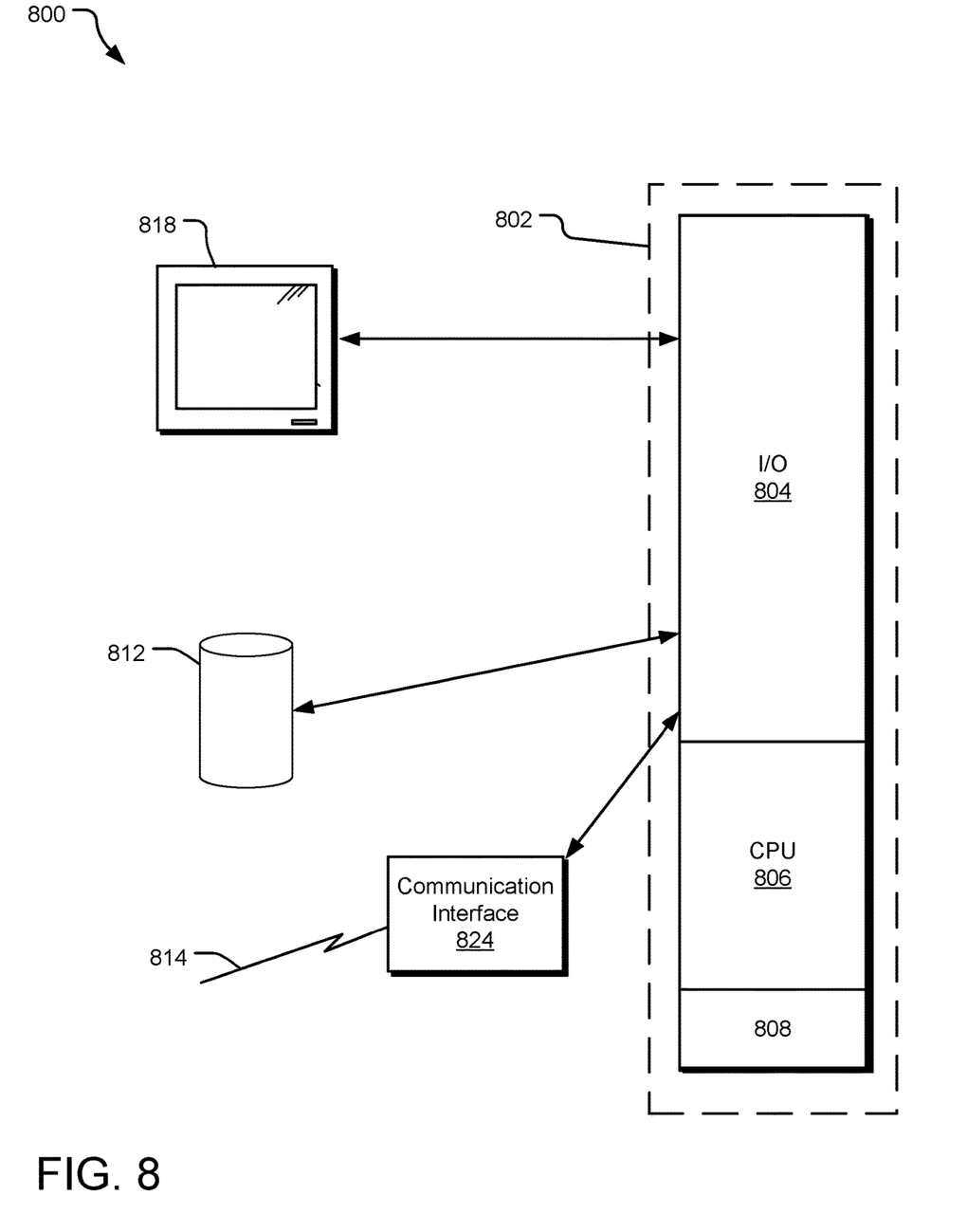
FIG. 8 illustrates an example processing system that may be useful in implementing the described technology.

FIG. 8 illustrates an example processing system 800 that may be useful in implementing the described technology. The processing system 800 is capable of executing a computer program product embodied in a tangible computer-readable storage medium to execute a computer process. Data and program files may be input to the processing system 800, which reads the files and executes the programs therein using one or more processors (CPUs or GPUs). Some of the elements of a processing system 800 are shown in FIG. 8 wherein a processor 802 is shown having an input/output (I/O) section 804, a Central Processing Unit (CPU) 806, and a memory section 808. There may be one or more processors 802, such that the processor 802 of the processing system 800 comprises a single central-processing unit 806, or a plurality of processing units. The processors may be single core or multi-core processors. The processing system 800 may be a conventional computer, a distributed computer, or any other type of computer. The described technology is optionally implemented in software loaded in memory 808, a storage unit 812, and/or communicated via a wired or wireless network link 814 on a carrier signal (e.g., Ethernet, 3G wireless, 8G wireless, LTE (Long Term Evolution)) thereby transforming the processing system 800 in FIG. 8 to a special purpose machine for implementing the described operations. The processing system 800 may be an application specific processing system configured for supporting a distributed ledger. In other words, the processing system 800 may be a ledger node.

The I/O section 804 may be connected to one or more user-interface devices (e.g., a keyboard, a touch-screen display unit 818, etc.) or a storage unit 812. Computer program products containing mechanisms to effectuate the systems and methods in accordance with the described technology may reside in the memory section 808 or on the storage unit 812 of such a system 800.

A communication interface 824 is capable of connecting the processing system 800 to an enterprise network via the network link 814, through which the computer system can receive instructions and data embodied in a carrier wave. When used in a local area networking (LAN) environment, the processing system 800 is connected (by wired connection or wirelessly) to a local network through the communication interface 824, which is one type of communications device. When used in a wide-area-networking (WAN) environment, the processing system 800 typically includes a modem, a network adapter, or any other type of communications device for establishing communications over the wide area network. In a networked environment, program modules depicted relative to the processing system 800 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 808 and/or the storage unit 812 and executed by the processor 802. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 808 and/or the storage unit 812 and executed by the processor 802.

The processing system 800 may be implemented in a device, such as a user device, storage device, IoT device, a desktop, laptop, computing device. The processing system 800 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   initiating a security incident blockchain for a network comprising a plurality nodes;
   provisioning each the plurality of nodes in the network with a synchronous key wherein a master node has a copy of all of the synchronous keys;
   adding a configuration transaction to the security incident blockchain, the configuration transaction including security policies for the plurality of nodes in the network;
   detecting a security incident at one of the plurality of nodes in the network; and
   in response to the detection of the security incident, performing a security incident response in compliance with the security policies as provided in the configuration transaction.

2. The method of claim 1, further comprising generating a security incident transaction based on the detected security incident.

3. The method of claim 2, wherein the security incident transaction further comprising an identifier of a node detecting the security incident, a plain text description of the security incident, and a cipher text regarding the security incident.

4. The method of claim 3, wherein the cipher text regarding the security incident is generated by encrypting content of P2 using an advanced encryption standard (AES) key of the node detecting the incident.

5. The method of claim 2, further comprising communicating the security incident transaction to other of the plurality of nodes.

6. The method of claim 5, further comprising:
   in response to receiving the security incident transaction, generating a security incident response, updating the security policies for the plurality of nodes in the network, and generating a new configuration transaction using the updated security policies.

7. The method of claim 1, wherein the plurality of nodes of the network comprising one or more user nodes, one or more control nodes, and a master node.

8. The method of claim 7, further comprising:
receiving the security incident transaction at a routing node outside the network comprising a plurality nodes; and
determining if the security incident transaction is to be communicated to another blockchain related to another network of nodes.

9. One or more non-transitory processor-readable storage media encoding processor-executable instructions for executing on a computer system a computer process, the computer process comprising:
initiating a security incident blockchain for a network comprising a plurality nodes;
provisioning each the plurality of nodes in the network with a synchronous key wherein a master node has a copy of all of the synchronous keys;
adding a configuration transaction to the security incident blockchain, the configuration transaction including security policies for the plurality of nodes in the network;
detecting a security incident at one of the plurality of nodes in the network; and
in response to the detection of the security incident, performing a security incident response in compliance with the security policies as provided in the configuration transaction.

10. The one or more non-transitory processor-readable storage media of claim 9 wherein the computer process further comprising generating a security incident transaction based on the detected security incident.

11. The one or more non-transitory processor-readable storage media of claim 10, wherein the security incident transaction further comprising an identifier of a node detecting the security incident, a plain text description of the security incident, and a cipher text regarding the security incident.

12. The one or non-transitory more processor-readable storage media of claim 10, wherein the computer process further comprising communicating the security incident transaction to other of the plurality of nodes.

13. The one or non-transitory more processor-readable storage media of claim 12, wherein the computer process further comprising:
in response to receiving the security incident transaction, generating a security incident response, updating the security policies for the plurality of nodes in the network, and generating a new configuration transaction using the updated security policies.

14. The one or non-transitory more processor-readable storage media of claim 10, wherein the plurality of nodes of the network comprising one or more user nodes, one or more control nodes, and a master node.

15. The one or more non-transitory processor-readable storage media of claim 14, wherein the computer process further comprising:
receiving the security incident transaction at a routing node outside the network comprising a plurality nodes; and
determining if the security incident transaction is to be communicated to another blockchain related to another network of nodes.

16. A system comprising:
one or more processors;
a memory;
a master node configured to:
initiate a security incident blockchain for a network comprising a plurality nodes;
provision each the plurality of nodes in the network with a synchronous key wherein a master node has a copy of all of the synchronous keys;
add a configuration transaction to the security incident blockchain, the configuration transaction including security policies for the plurality of nodes in the network; and
a user node configured to:
detect a security incident at one of the plurality of nodes in the network; and
in response to the detection of the security incident, perform a security incident response in compliance with the security policies as provided in the configuration transaction.

17. The system of claim 16 wherein the user node is further configured to generate a security incident transaction based on the detected security incident.

18. The system of claim 17 wherein the security incident transaction further comprising an identifier of a node detecting the security incident, a plain text description of the security incident, and a cipher text regarding the security incident.

19. The system of claim 18, wherein the cipher text regarding the security incident is generated by encrypting content of P2 using an advanced encryption standard (AES) key of the node detecting the incident.

20. The system of claim 18, wherein the user node is further configured to communicate the security incident transaction to other of the plurality of nodes.

* * * * *